United States Patent [19]
Kelderman

[11] Patent Number: 5,155,986
[45] Date of Patent: Oct. 20, 1992

[54] FOLDING HAY RAKING AND WINDROWING APPARATUS

[76] Inventor: Gary L. Kelderman, R.R. 1, Oskaloosa, Iowa 52577

[21] Appl. No.: 760,338

[22] Filed: Sep. 16, 1991

[51] Int. Cl.[5] .......................................... A01D 76/00
[52] U.S. Cl. ...................................... 56/365; 56/377
[58] Field of Search ............................... 56/365–369, 56/375–377, 341, 14.7, 14.8

[56] References Cited

U.S. PATENT DOCUMENTS

| | | | |
|---|---|---|---|
| 3,128,589 | 4/1964 | Vanderlely et al. | 56/365 |
| 3,948,028 | 4/1976 | Reber | 56/365 |
| 4,214,428 | 7/1980 | Caraway . | |
| 4,723,401 | 2/1988 | Webster et al. . | |
| 4,723,402 | 2/1988 | Webster et al. . | |
| 4,753,063 | 6/1988 | Buck . | |
| 4,785,614 | 11/1988 | Schoenherr | 56/365 |
| 4,974,407 | 12/1990 | Rowe et al. . | |
| 4,977,734 | 12/1990 | Rowe et al. . | |

OTHER PUBLICATIONS

Copy of 4-page Brochure–ICAM–International Company of Agricultural Machineries and entitled Mounted Side–Delivery Rake.

Copy of 4-page Brochure of ICAM–International Company of Agricultural Machineries and entitled Mounted Side–Delivery Rake Series IR/3–IR/4–IR/-5–IRV/8–IRV/10.

*Primary Examiner*—Thuy M. Bui
*Attorney, Agent, or Firm*—Henderson & Sturm

[57] ABSTRACT

A crop raking apparatus having a pair of arms pivotally attached along the vertical axis to a frame. A side delivery type rake having rotatable radially extending teeth is attached to each of the arms. A mechanism is provided for pivoting each one of the rakes about a substantially horizontal axis from a deployed raking position when the respective arm is out to an upper transport position when the respective radial arm is pivoted inwardly. The arms are connected together to the frame by link members which are powered by a hydraulic cylinder.

9 Claims, 3 Drawing Sheets

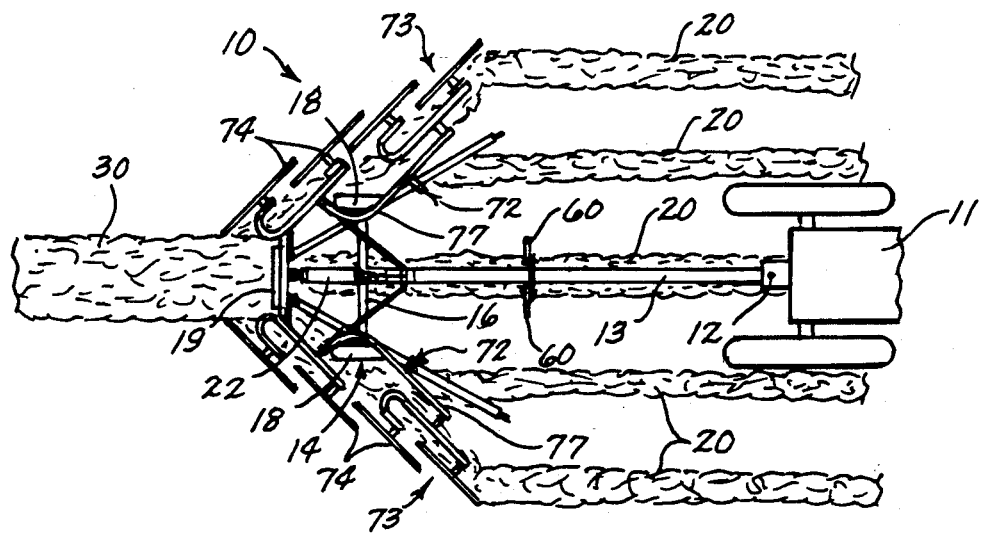
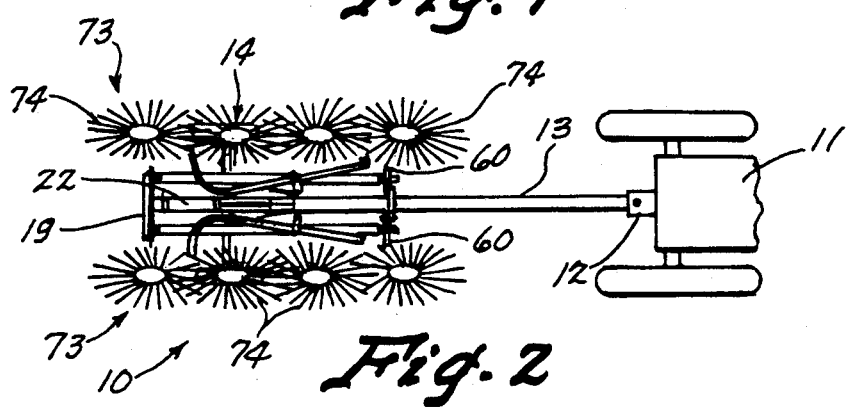
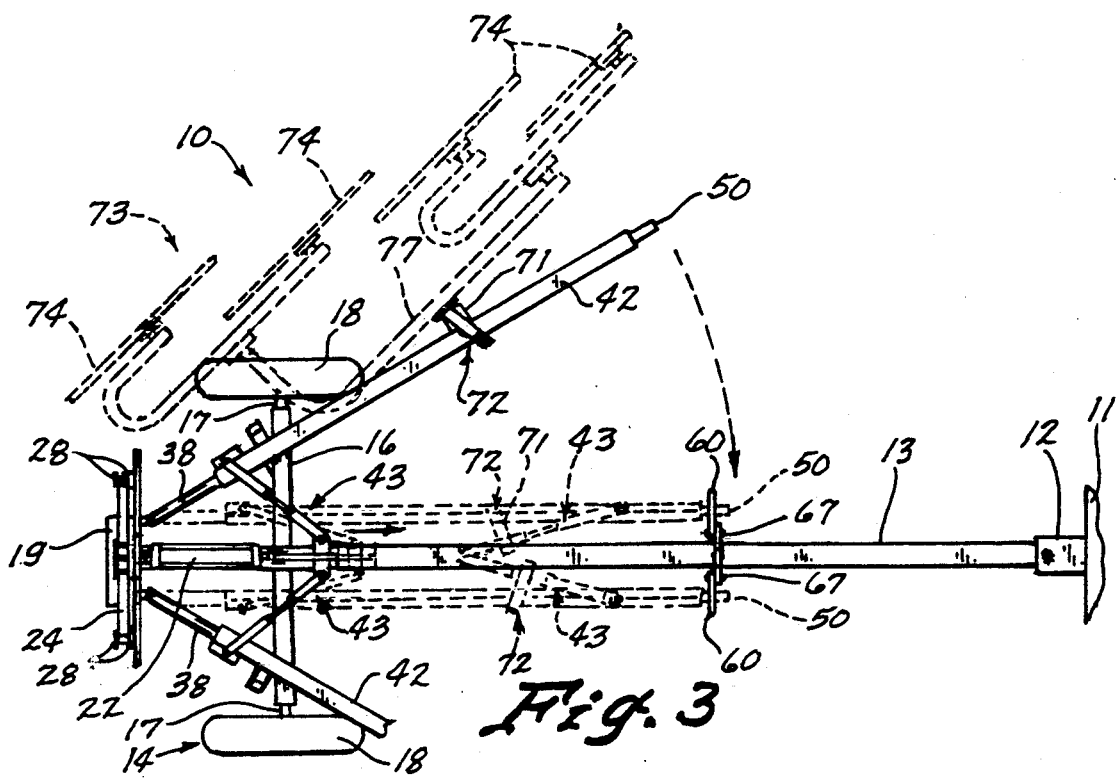

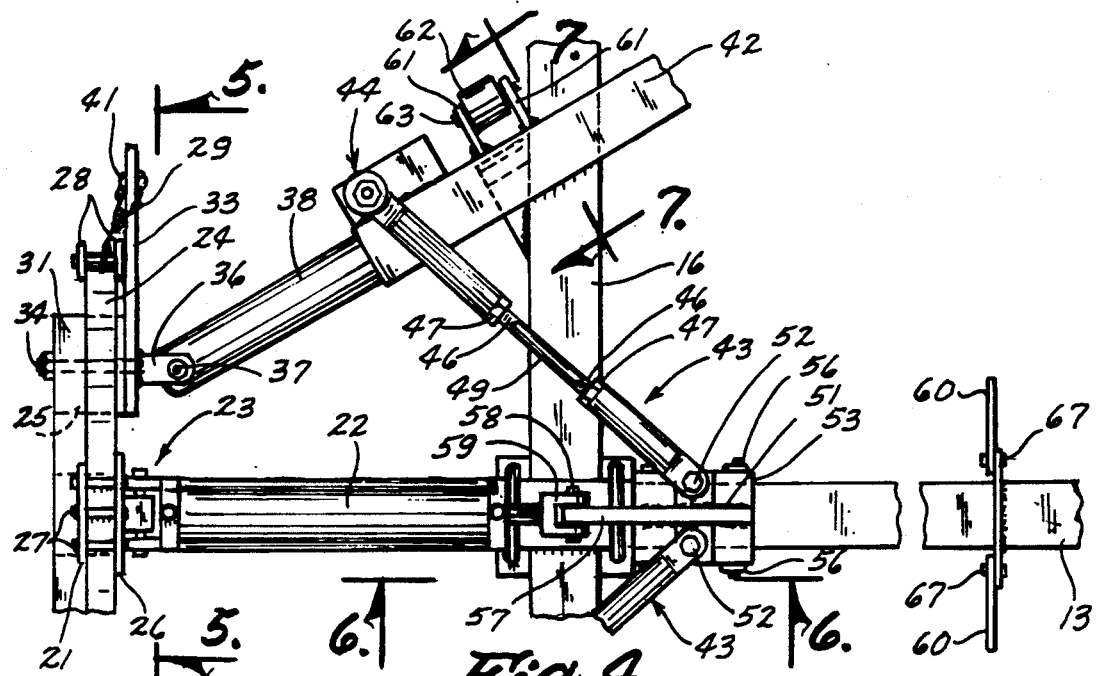

FOLDING HAY RAKING AND WINDROWING APPARATUS

TECHNICAL FIELD

The present invention relates generally to a side delivery rake apparatus and more particularly to a universal cart for attaching two wheel-type side delivery rakes together to form a pull-type V-rake and mounting them for automatic folding between an operative field position and a transport position.

BACKGROUND ART

Side delivery rakes are commonly used to form long windows or to combine smaller windrows into larger windrows so that a baler, stacker or the like can pick up the windrow and package it into bales, stacks or the like. One of the most common types of side delivery rakes is commonly referred to as a wheel rake and has a plurality of wheels with evenly spaced teeth extending radially outwardly therearound. Normally a plurality of these toothed wheels are disposed in overlapping relationship with each toothed wheel being disposed forwardly and to one side of the next toothed wheel. These toothed wheels are movable about an axis to move hay rearwardly and to one side as the rake moves forwardly. This wheel-type rake is produced by several companies in Italy and is a common rake imported into the United States. Because farms are small and tractors are small in Italy, these wheel rakes are small in comparison to most side delivery rakes sold in the USA.

One Italian company has developed a frame adapted to be attached to a large tractor's three point hitch and two of these rakes are placed together on a frame to form a V-type rake. This is used to rake hay inwardly and rearwardly on the right side and the left side to produce a single and larger windrow as the V-rake travels through the hay field.

A problem associated with the imported V-rake attached to a single frame and to a tractor's three point hitch is that it must be manually folded between its transport or storage position and its operative field position. Because this is done manually, it is inconvenient. The market for this product is still considerable because it is much cheaper than side delivery rakes of a similar size produced by some of the major U.S. manufacturers.

Another problem with the aforementioned V-rake is that if a tractor passes over a rise in the terrain, such as a terrace, as the front end of the tractor goes down, the rear of the tractor will go up and this will cause the rake, which extends some distance behind the tractor's three point hitch, to lift high in the air and not rake the hay thereunder at such time.

Consequently, there is a need for a wheel-type rake apparatus which takes advantage of the more economical costs of wheel-type rakes and yet overcomes the problem of awkward manual folding and cantilevered mounting off of the back of the three point hitch which may cause certain portions of the field to not be raked efficiently.

DISCLOSURE OF THE INVENTION

The present invention relates to a crop raking apparatus having a pair of arms pivotally attached along the vertical axis to a frame. A side delivery type rake having rotatable radially extending teeth is attached to each of the arms. A mechanism is provided for pivoting each one of the rakes about a substantially horizontal axis from a deployed raking position when the respective arm is out to an upper transport position when the respective radial arm is pivoted inwardly about a vertical axis. The arms are connected together to the frame by link members which are powered by a hydraulic cylinder.

An object of the present invention is to provide an improved side delivery raking and windrowing apparatus.

A further object of the present invention is to provide a cart which will accept a pair of standard wheel rakes which can be deployed in a V-configuration and easily hydraulically or pneumatically folded between the normal field operative position and a raised transport or storage position.

A still further object of the present invention is to provide a universal mounting apparatus for attaching wheel-type rakes to this aforementioned cart to permit both lateral and vertical adjustments and to accommodate most brands of wheel rakes.

Other objects, advantages, and novel features of the present invention will become apparent from the following detailed description of the invention when considered in conjunction with the accompanying drawings.

BRIEF DESCRIPTION OF THE DRAWINGS

FIG. 1 is a top plan view of a preferred embodiment of the present invention shown in an operational position raking several smaller windrows of hay into a single, larger windrow;

FIG. 2 is a top plan view showing the preferred embodiment of the present invention;

FIG. 3 is an enlarged partial top plan view showing in solid lines the position of the folding frame in the deployed position with the rake on one side shown in dashed lines and the frame as shown in dashed lines in the folded position thereof but without the rakes attached thereto which would otherwise obscure the view of the folding device in the folded position thereof;

FIG. 4 is an enlarged partial top view of the folding mechanism of the present invention showing also the mechanism which causes the rakes to pivot between the position shown in FIG. 1 and the position shown in FIG. 2 as the arm is pivoted between the outer and inner position thereof;

FIG. 5 is an enlarged partial cross sectional view taken along line 5—5 of FIG. 4 showing a chain, adjustable arm, and leaf spring arrangement for adjusting the extent of downward travel on the pivoted arms and therefore on the rakes attached thereto;

FIG. 6 is an enlarged cross sectional view taken along 6—6 of FIG. 4;

FIG. 7 is an enlarged partial cross sectional view taken along line 7—7 of FIG. 4 and showing the cam and cam follower arrangement used for pivoting the elongated member with respect to the pivoted arm;

FIG. 8 is an enlarged top view of the connection between the side delivery rake unit shown in dashed lines in FIG. 8 and the elongated member which pivots onto the arm of one side of the frame;

FIG. 9 is an enlarged cross sectional view taken along line 9—9 of FIG. 8;

BEST MODE FOR CARRYING OUT THE INVENTION

Figure 10:
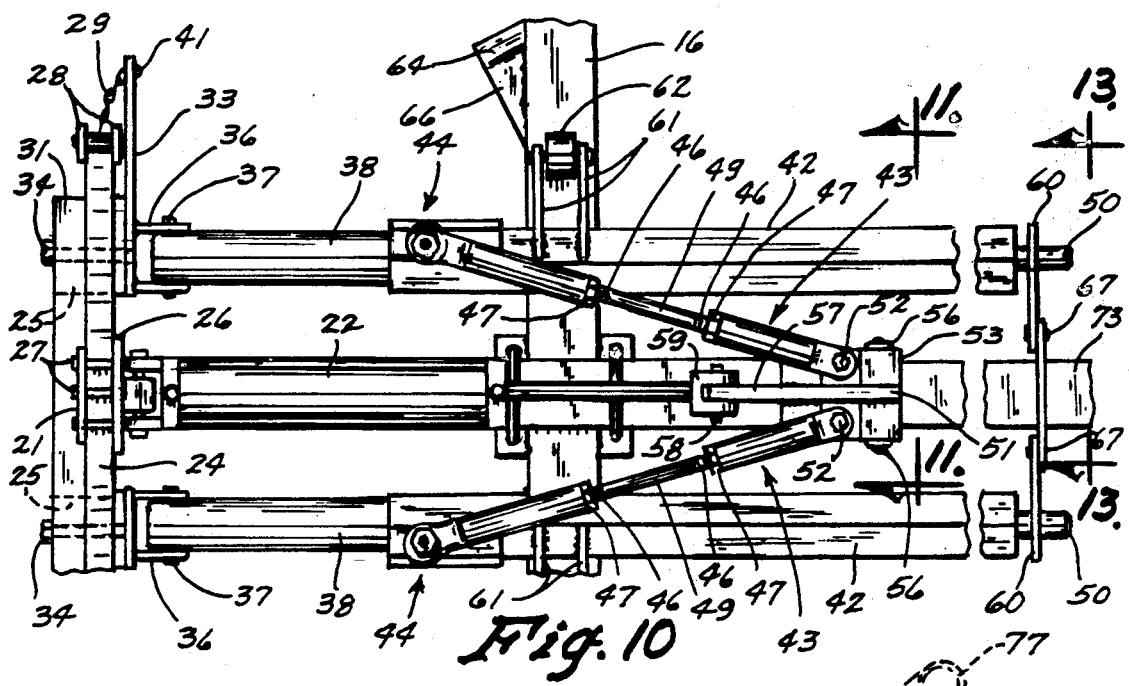
FIG. 10 is an enlarged partial plan view of the apparatus in the folded position as shown in FIG. 2 but not showing the side delivery rakes which would otherwise obscure the folding mechanism of the present invention.

Referring now to the drawings wherein like reference numerals designate identical or corresponding parts throughout the several views, FIG. 1 shows a hay raking apparatus (10) constructed in accordance with the present invention connected to a tractor (11) through a hitch (12).

A frame (13) has a wheel unit (14) comprised of a member (16) having elements (17) rotatably attached thereto and wheels (18) operably rotatably attached to the member (16). The wheel (18) can either be rotatably attached to the member (17) or the member (17) can be an axle extending through the member (16) and rotatably attached thereto.

The frame (13) has a rear portion (19) and an upstanding portion (21) to which hydraulic cylinder (22) is attached by a standard pivotal connection (23) shown in FIG. 4. The upper portion of upstanding member (21) has a leaf spring (24) secured by brackets (26) and nut and bolt fasteners (27).

The leaf springs (24) have brackets (28) attached to each end thereof and a chain (29) is connected to the brackets (28) on each side of member (19). Vertical struts (30) connect at the bottom thereof with member (19) and at the top thereof a member (31) connects to vertical members (25) on each side of vertical member (21).

Referring to FIG. 4 it is noted that an arm (33) is pivotally attached by nut and bolt fastener (34) which pivotally extends through the hole in member (19) and is rigidly connected to the arm (33) shown in FIGS. 4 and 5. A clevis (36) has a nut and bolt fastener (37) extending therethrough and through an opening in arm (38) so that the arm (38) can pivot about the clevis (36).

Returning to FIG. 5, it is noted that a plurality of openings (39) in arm (33) are present so that the arm (38) can be adjusted up or down, for example from the position shown in solid lines in FIG. 5 to a lower position (not shown) by pinning with pin (41) into one of the openings (39) the chain (29) or by pinning with pin (41) to chain (20) into one of the upper links of chain (29) and inner holes (39) to move the arm to the dashed line position shown in FIG. 5.

Referring to FIG. 4, it is noted that elongated member (42) telescopes over arm (38) so that elongated member (42) can rotate with respect to arm (38). The elongated member (42) has a link member (43) attached through a universal joint (44), shown in FIG. 7, and the link (43) is adjustable similar to the adjustment of a turnbuckle by threaded portions (46) and nuts (47) threadably engaging the rod (49). The other end of the links (43) are pivotally attached to a bracket (51) which is slidably disposed on the frame member (13) as shown in FIGS. 4 and 6.

The bracket (51) has a flange (53) extending down on each side thereof and has a pair of rollers (54) pivotally rotatably attached by members (56) which are rigidly attached to flanges (53). A rearwardly extending portion (57) has an opening therein for receiving a pin (58) for clevis (59) of hydraulic cylinder (22). The rollers (54) extend completely under the frame (13) and connect from one side to the other so as to reduce the friction when the bracket (51) moves between the solid line and dashed line position shown in FIG. 6.

Referring to FIG. 7, it is noted that a flange (61) is secured to each of the elongated members (42) and that a roller (62) is rotatably attached by a pin (63) to the end of the follower flange (61). A cam surface (64) extends upwardly from horizontal portion (66), which is welded to the cross member (16) of the wheel unit (14).

FIGS. 8 and 9 show brackets (71) which are bolted to elongated members (42) and side delivery rake connectors (72) for connection to the side delivery rake (73) to the elongated members (42). Portion (76) of the rakes (73) connect to rake frame (77) and the rake connector (76) merely slides into the sleeve (78) of connector (72) and is bolted into place by fasteners (79) which tightly hold one end of member (76) in place. A washer (81) on the other end of member (76) prevents the member (76) from sliding out of its relationship with sleeve (78). An upstanding sleeve (82) is rigidly connected to sleeve (78) as can readily be seen in FIG. 9. This sleeve (82) is welded to bracket (71) as can be seen in FIG. 12.

In operation, the device can be used in the fashion shown in FIG. 1 wherein the side delivery rake unit (73) is positioned so that the tine wheel (74) will keep rotating and pushing the hay in windrows (20) inwardly and into an enlarged central windrow (30). In this respect, these rakes operate identically to that disclosed in U.S. patent application Ser. No. 07/615,469, filed Nov. 19, 1990, to Kelderman, which application is incorporated herein by reference. If it is desired to move the rake unit (73) up or down so that it is at the proper relationship with respect to the ground, the chain (29) and pin (41) can be moved into the proper opening in lever (33) of FIG. 5 to pull the lever up or down as needed in order to properly adjust the rake unit (73) with respect to the ground. The leaf spring (24) serves as a shock absorber.

When it is desired to move the rake unit (73) from the operative position shown in FIG. 1 to the transport position shown in FIG. 2, the hydraulic cylinder (22) is lengthened from the position shown in solid lines in FIG. 6 to the position shown in dashed lines in FIG. 6, which will pull on the link members (43) and will pivot the arms (38) from the position shown in solid lines in FIG. 3 to the position shown in dashed lines in FIG. 3. This also corresponds to the position shown in FIG. 10.

Figure 11:
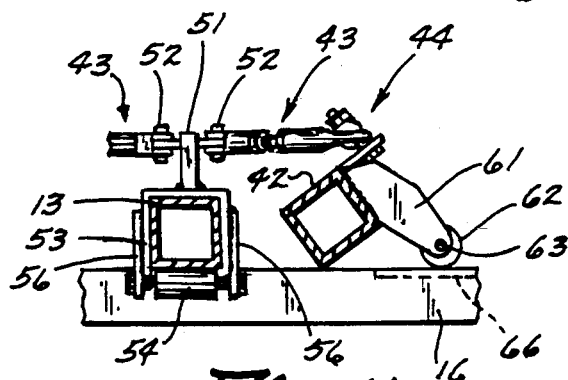
FIG. 11 is an enlarged cross sectional view taken along line 11—11 of FIG. 10.
Figure 12:
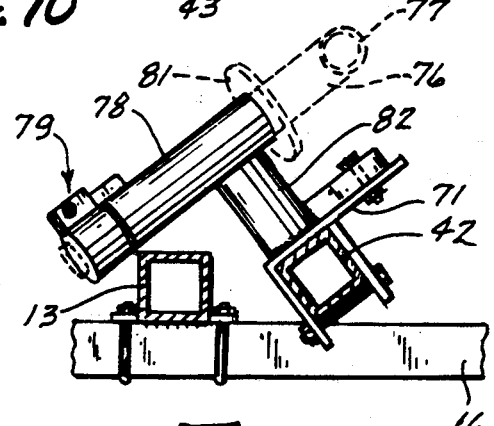
FIG. 12 is a view like FIG. 11 but showing the rake portion of FIGS. 8 and 9 attached to the elongated member and also showing it in the transport position thereof.

During the process of pulling the arms (38) inwardly from the position shown in FIG. 4 to the position shown in FIG. 10, the roller (62) will be pulled into engagement with the cam (64) shown in FIG. 7 and when the roller (62) rolls up over cam (64) and onto the platform (66), and ultimately onto member (16), the elongated member will be rotated from the position shown in FIG. 4 to the position shown in FIG. 10 which will also cause the rakes (73) and brackets (72) to be pivoted from the position shown in FIG. 9 to the position shown in FIG. 12. The FIG. 12 position also corresponds to the FIG. 2 position wherein the rakes (73) are moved to the transport position. It is important for the reader to follow the cam follower (61) and the roller (62) during the process from FIG. 7 to the FIG. 11 position in order to appreciate how the elongated member (42) pivots about the arm (38). Also, note that the universal joint (44)

permits the sleeve (42) to rotate around arm (34) in this process.

To move the device (10) from the FIG. 2 transport position to the FIG. 1 operational position, the above described process is reversed by merely shortening the hydraulic cylinder (22) to the FIG. 1, 3 and 4 positions.

While not shown in the drawings specifically, it will also be appreciated by those skilled in this art that the rake units (73) can be lifted partially by moving the hydraulic cylinder to lengthen to the extent that the roller (62) of FIG. 7 rolls partially up onto the cam (64) just enough to rotate elongated members (42) sufficiently to turn the rake unit (73) enough to raise rake units (73) above the windrows (20), but not so far as to move the entire rakes into the FIG. 2 configuration. This is useful when the operator comes to the end of a row and merely wishes to lift the rake unit (73) up off the ground and not disturb previously made windrows, but does not wish to move the rake device to its complete transport position shown in FIG. 2. Then, once a turn has been made, the hydraulic cylinder (22) can again be shortened to the FIG. 1, 3 and 4 solid line configuration to continue to rake the next area.

Figure 13:
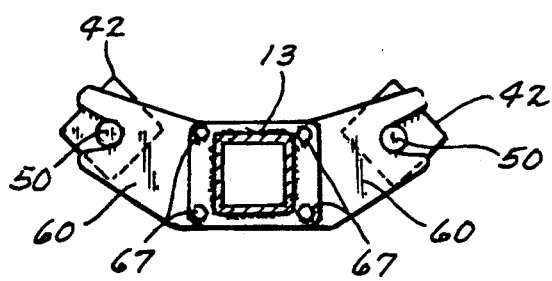
FIG. 13 is an enlarged partial cross sectional view taken along line 13—13 of FIG. 10.

FIGS. 10 and 13 show how extensions (50) of elongated members (42) fit into slots in flanges (60) to support members (42) and arms (38) when the device is in the transport position. Bolts (67) connect flanges (60) to frame (13).

Accordingly, it will be appreciated that the preferred embodiment disclosed herein does indeed accomplish the aforementioned objects. Obviously, many modifications and variations of the present invention are possible in light of the above teachings. It is therefore to be understood that, within the scope of the appended claims, the invention may be practiced otherwise than as specifically described.

I claim:

1. Crop raking apparatus comprising:
   a frame adapted to be attached to a prime mover;
   wheel unit means operatively attached to said frame for permitting said frame to be towed from place to place;
   a first arm pivotally attached to said frame about a first vertical axis;
   a second arm pivotally attached to aid frame about a vertical axis;
   a first elongated member disposed in a telescoping relationship with said first arm;
   means for permitting said first elongated member to rotate with respect to said first arm;
   a second elongated member disposed in a telescoping relationship with said second arm;
   means for permitting said second elongated member to rotate with respect to said second arm;
   first raking means operably attached to said first elongated member for raking cut crops into a windrow;
   second raking means operably attached to said second elongated member for raking cut crops into a windrow;
   first link means operably connected to said frame for pivoting said first arm, said first elongated member and said first rake means between an inner pivotal position and an outer pivotal position;
   first rotating means for rotating said first elongated member and said first rake means between a transport position when said first arm, said first elongated member and said first rake means are in the outer pivotal position thereof whereby said first rake means engages and windrows cut crops lying in a field;
   second link means operably connected to said frame for pivoting said second arm, said second elongated member and said second rake means between an inner pivotal position and an outer pivotal position;
   second rotating means for rotating said second elongated member and said second rake means between a transport position when said second arm, said second elongated member and second rake means are in the inner position thereof and a second operative position when said second arm, said second elongated member and said second rake means are in the outer pivotal position thereof whereby said second rake means engages and windrows cut crops lying in a field; and
   power means for selectively pivoting said first and second link means.

2. The apparatus of claim 1 wherein said first rotating means comprises a cam operatively attached to one of said first elongated member and said frame and a cam follower operatively attached to the other one of said first elongated member and said frame.

3. The apparatus of claim 2 wherein said cam includes an inclined plate operatively attached to said frame and said follower includes a roller attached to said first elongated member.

4. The apparatus of claim 3 wherein said second rotating means comprises a second cam operatively attached to on of said second elongated member and said frame and a second cam follower operatively attached to the other one of said second elongated member and said frame.

5. The apparatus of claim 4 wherein said second cam includes a second inclined plate attached to said frame and said second follower includes a second roller attached to said second elongated member.

6. The apparatus of claim 5 wherein said power means includes a hydraulic cylinder operatively attached at one end thereof to said frame.

7. The apparatus of claim 6 including:
   a bracket operatively attached to the other end of said hydraulic cylinder;
   said first link means including a first link member pivotally attached at one end to said bracket and at the other end to said first elongated member; and
   said second link means including a second link member pivotally attached at one end thereof to said bracket and at the other end thereof to said second elongated member.

8. The apparatus of claim 7 including universal joint means associated with said first link member to permit said first elongated member to pivot about more than one axis with respect to said first link member.

9. The apparatus of claim 8 including universal joint means associated with said second link member to permit said second elongated member to pivot about more than one axis with respect to said second link member.

* * * * *